US010923956B2

(12) United States Patent
Chen

(10) Patent No.: US 10,923,956 B2
(45) Date of Patent: Feb. 16, 2021

(54) INDUCTIVE POWER TRANSMITTER

(71) Applicant: Apple Inc., Cupertino, CA (US)

(72) Inventor: Liang Chen, Auckland (NZ)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 15/966,511

(22) Filed: Apr. 30, 2018

(65) Prior Publication Data
US 2018/0248408 A1    Aug. 30, 2018

Related U.S. Application Data

(63) Continuation of application No. PCT/NZ2016/050181, filed on Nov. 15, 2016.

(60) Provisional application No. 62/257,659, filed on Nov. 19, 2015.

(51) Int. Cl.
H02J 50/12 (2016.01)
H02J 50/60 (2016.01)
H02J 5/00 (2016.01)
H02J 50/05 (2016.01)
H02J 7/02 (2016.01)

(52) U.S. Cl.
CPC ............. H02J 50/12 (2016.02); H02J 5/005 (2013.01); H02J 7/025 (2013.01); H02J 50/05 (2016.02); H02J 50/60 (2016.02)

(58) Field of Classification Search
CPC ............. H02J 50/12; H02J 5/005; H02J 50/60
USPC .......................................... 320/108; 307/104
See application file for complete search history.

(56) References Cited

U.S. PATENT DOCUMENTS

| 4,960,983 | A | 10/1990 | Inoue |
| 5,536,979 | A | 7/1996 | McEachern et al. |
| 5,850,135 | A | 12/1998 | Kuki et al. |
| 6,157,162 | A | 12/2000 | Hayashi et al. |
| 6,219,267 | B1 | 4/2001 | Andres |
| 6,803,744 | B1 | 10/2004 | Sabo |
| 7,164,255 | B2 | 1/2007 | Hui |
| 7,495,414 | B2 | 2/2009 | Hui |
| 7,989,986 | B2 * | 8/2011 | Baarman ................. H02J 7/025 |
| | | | 307/104 |

(Continued)

FOREIGN PATENT DOCUMENTS

| CN | 1954472 A | 4/2007 |
| CN | 101335468 A | 12/2008 |

(Continued)

OTHER PUBLICATIONS

Thrimawithana et al. "Analysis of Split-Capacitor Push-Pull Parallel-Resonant converter in Boost Mode." IEEE Transactions on Power Electronics. vol. 23. No. 1. (2008) Abstract only.

(Continued)

Primary Examiner — Richard V Muralidar
(74) Attorney, Agent, or Firm — Blank Rome LLP

(57) ABSTRACT

An inductive power transmitter comprising: a converter configured to generate at least two object detection signals at substantially different frequencies, at least one transmitting coil configured to generate a magnetic field based on the object detection signals, and a controller configured to determine or measure circuit parameter(s) in relation to the coil to determine the inductance of the coil at each of the frequencies, and determine whether and/or what kind of object is present depending on a change in inductance between each of the frequencies.

27 Claims, 3 Drawing Sheets

(56) References Cited

U.S. PATENT DOCUMENTS

| | | | |
|---|---|---|---|
| 8,446,046 B2* | 5/2013 | Fells | H02J 5/005 |
| | | | 307/104 |
| 9,229,069 B2* | 1/2016 | Hyodo | H02J 50/80 |
| 9,275,790 B2* | 3/2016 | Irie | H02J 7/025 |
| 9,735,626 B2 | 8/2017 | Hyodo | |
| 9,933,539 B2* | 4/2018 | Miyashita | G01V 3/10 |
| 9,941,753 B2* | 4/2018 | Asanuma | G01R 27/2611 |
| 2003/0169013 A1 | 9/2003 | Kadah | |
| 2003/0214821 A1 | 11/2003 | Giannopoulos et al. | |
| 2005/0068019 A1 | 3/2005 | Nakamura et al. | |
| 2005/0116683 A1 | 6/2005 | Cheng et al. | |
| 2006/0202665 A1 | 9/2006 | Hsu | |
| 2007/0049997 A1 | 3/2007 | Fields et al. | |
| 2007/0131505 A1 | 6/2007 | Kim | |
| 2007/0182367 A1 | 8/2007 | Partovi | |
| 2007/0228833 A1 | 10/2007 | Stevens et al. | |
| 2007/0296393 A1 | 12/2007 | Malpas et al. | |
| 2008/0211458 A1 | 9/2008 | Lawther et al. | |
| 2009/0001941 A1 | 1/2009 | Hsu et al. | |
| 2009/0033280 A1 | 2/2009 | Choi et al. | |
| 2009/0174264 A1 | 7/2009 | Onishi et al. | |
| 2009/0203345 A1 | 8/2009 | Sorrells et al. | |
| 2010/0084918 A1 | 4/2010 | Fells et al. | |
| 2010/0135634 A1 | 6/2010 | Ito et al. | |
| 2010/0187912 A1 | 7/2010 | Kitamura et al. | |
| 2010/0244577 A1 | 9/2010 | Shimokawa | |
| 2010/0259217 A1 | 10/2010 | Baarman et al. | |
| 2010/0314946 A1 | 12/2010 | Budde et al. | |
| 2010/0328044 A1 | 12/2010 | Waffenschmidt et al. | |
| 2011/0049997 A1 | 3/2011 | Urano | |
| 2011/0062793 A1 | 3/2011 | Azancot et al. | |
| 2011/0089768 A1 | 4/2011 | Byrne et al. | |
| 2011/0128015 A1 | 6/2011 | Dorairaj et al. | |
| 2011/0128714 A1 | 6/2011 | Terao et al. | |
| 2011/0196544 A1 | 8/2011 | Baarman et al. | |
| 2012/0077537 A1 | 3/2012 | Muratov et al. | |
| 2012/0175967 A1* | 7/2012 | Dibben | H02J 50/12 |
| | | | 307/104 |
| 2012/0181875 A1 | 7/2012 | Wechlin et al. | |
| 2012/0313577 A1 | 12/2012 | Moes et al. | |
| 2012/0326521 A1 | 12/2012 | Bauer et al. | |
| 2013/0030892 A1 | 1/2013 | Liu et al. | |
| 2013/0062959 A1 | 3/2013 | Lee et al. | |
| 2013/0069441 A1 | 3/2013 | Verghese et al. | |
| 2013/0093257 A1 | 4/2013 | Goto | |
| 2013/0097078 A1 | 4/2013 | Wong et al. | |
| 2013/0119773 A1 | 5/2013 | Davis | |
| 2013/0127255 A1 | 5/2013 | Tsujimoto | |
| 2013/0154557 A1 | 6/2013 | Lee et al. | |
| 2013/0221913 A1 | 8/2013 | Kim | |
| 2013/0241300 A1 | 9/2013 | Miyamoto | |
| 2013/0263596 A1 | 10/2013 | Arisawa | |
| 2014/0015329 A1 | 1/2014 | Widmer et al. | |
| 2014/0015522 A1 | 1/2014 | Widmer et al. | |
| 2014/0084857 A1 | 3/2014 | Liu et al. | |
| 2014/0009178 A1 | 4/2014 | Hyodo | |
| 2014/0091634 A1 | 4/2014 | Mayo et al. | |
| 2014/0091755 A1 | 4/2014 | Walley et al. | |
| 2014/0103732 A1 | 4/2014 | Irie et al. | |
| 2014/0103733 A1 | 4/2014 | Irie et al. | |
| 2014/0111019 A1 | 4/2014 | Roy et al. | |
| 2014/0111154 A1 | 4/2014 | Roy et al. | |
| 2014/0197687 A1 | 7/2014 | Lin | |
| 2015/0015597 A1 | 1/2015 | Sano et al. | |
| 2015/0054355 A1 | 2/2015 | Ben-Shalom et al. | |
| 2015/0070094 A1 | 3/2015 | Pham | |
| 2015/0162785 A1 | 6/2015 | Lee et al. | |
| 2015/0178532 A1 | 6/2015 | Brule | |
| 2015/0180286 A1 | 6/2015 | Asanuma | |
| 2015/0182086 A1 | 7/2015 | Dimbylow et al. | |
| 2015/0270719 A1 | 9/2015 | Kurs et al. | |
| 2015/0002859 A1 | 10/2015 | Oettinger | |
| 2015/0321567 A1 | 11/2015 | Czainski | |
| 2015/0323694 A1 | 11/2015 | Roy | |
| 2016/0142174 A1 | 5/2016 | Fine et al. | |
| 2016/0329755 A1 | 11/2016 | Park et al. | |
| 2017/0001177 A1 | 4/2017 | Muratov | |
| 2017/0237296 A1 | 8/2017 | Keith et al. | |
| 2017/0334602 A1 | 11/2017 | Church et al. | |
| 2018/0034326 A1 | 2/2018 | Abdolkhani | |
| 2018/0146344 A1 | 5/2018 | Kwon et al. | |
| 2019/0386519 A1* | 12/2019 | Chen | H02J 5/005 |

FOREIGN PATENT DOCUMENTS

| | | |
|---|---|---|
| CN | 103782485 A | 5/2014 |
| CN | 104734369 A | 6/2015 |
| DE | 202009009693 U1 | 11/2010 |
| DE | 102012020670 A1 | 3/2017 |
| EP | 1022840 A2 | 7/2000 |
| EP | 2017940 A2 | 1/2009 |
| EP | 2600483 A2 | 6/2013 |
| EP | 2602908 A1 | 6/2013 |
| EP | 3127215 A1 | 2/2017 |
| JP | H01157896 A | 6/1989 |
| JP | 2003263668 A | 9/2003 |
| JP | 2005345435 A | 12/2005 |
| JP | 2008312294 A | 12/2008 |
| JP | 2009038685 A | 2/2009 |
| JP | 2009058692 A | 3/2009 |
| JP | 2009089209 A | 4/2009 |
| JP | 2009112137 A | 5/2009 |
| JP | 2009118587 A | 5/2009 |
| JP | 2009525715 A | 7/2009 |
| JP | 2010118881 A | 5/2010 |
| JP | 2010239690 A | 10/2010 |
| JP | 2010532712 A | 10/2010 |
| JP | 2010538596 A | 12/2010 |
| JP | 2011193671 A | 9/2011 |
| JP | 2012175793 A | 9/2012 |
| JP | 2012533277 A | 12/2012 |
| JP | 2013034291 A | 2/2013 |
| JP | 2013034292 A | 2/2013 |
| JP | 2013115981 A | 6/2013 |
| JP | 2013542424 A | 11/2013 |
| JP | 2014027102 A | 2/2014 |
| JP | 2014126512 A | 7/2014 |
| JP | 2014526871 A | 10/2014 |
| JP | 2014222994 A | 11/2014 |
| JP | 2015019283 A | 1/2015 |
| JP | 2015046990 A | 3/2015 |
| JP | 2015136281 A | 7/2015 |
| KR | 10-20080094953 A | 10/2008 |
| KR | 20100054885 A | 5/2010 |
| KR | 20140008975 A | 1/2014 |
| WO | 1989010030 A1 | 10/1989 |
| WO | 1997042695 A1 | 11/1997 |
| WO | 2005109597 A | 11/2005 |
| WO | 2005109598 A1 | 11/2005 |
| WO | 2007125697 A1 | 11/2007 |
| WO | 2008026080 A2 | 3/2008 |
| WO | 2008137996 A1 | 11/2008 |
| WO | 2009027674 A1 | 3/2009 |
| WO | 2009041058 A1 | 4/2009 |
| WO | 2009081115 A1 | 7/2009 |
| WO | 2009081126 A1 | 7/2009 |
| WO | 2011006758 A2 | 1/2011 |
| WO | 2011118371 A | 9/2011 |
| WO | 2013038808 A1 | 3/2013 |
| WO | 2013122483 A1 | 8/2013 |
| WO | 2013179394 A | 12/2013 |
| WO | 2014011776 A2 | 1/2014 |
| WO | 2014048161 A1 | 4/2014 |
| WO | 2014060871 A1 | 4/2014 |
| WO | 2014083015 A1 | 6/2014 |
| WO | 2014095722 | 6/2014 |
| WO | 2014095722 A2 | 6/2014 |
| WO | 2014095722 A2 | 10/2014 |

(56) References Cited

FOREIGN PATENT DOCUMENTS

| WO | 2015005025 A1 | 1/2015 |
| WO | 2015119458 A1 | 8/2015 |

OTHER PUBLICATIONS

Wu et al. "A Series-Tuned Inductive-Power-Transfer Pickup With a Controllable AC-Voltage Output," IEEE Translations on Power Electronics. vol. 26, No. 1. (2011) pp. 98-109.
Zou et al. "A new rectifier with combined power flow control capability for a series-tuned inductive-power-transfer receiver." IEEE International Conf. on Power System Technology (POWERCON). (2012) Abstract only.

* cited by examiner

INDUCTIVE POWER TRANSMITTER

FIELD

The invention generally relates to an inductive power transmitter for inductive power transfer (IPT) and in particular foreign object detection.

BACKGROUND

IPT is a well-known area of established technology used in many applications including wireless charging of portable electric devices. A charging mat is one way of providing a charging surface for a portable device, and has an interface surface incorporating a power transmitter with one or more transmitting coils that generate a time-varying magnetic field. The magnetic field induces an alternating current in a suitable receiving coil of a power receiver that can then be used to charge a battery, or power a device or other load.

SUMMARY

The present invention may provide an improved inductive power transmitter or may at least provide the public with a useful choice.

According to one example embodiment there is provided an inductive power transmitter comprising:
  a converter configured to generate at least two object detection signals at substantially different frequencies,
  at least one transmitting coil configured to generate a magnetic field based on the object detection signals, and
  a controller configured to determine or measure circuit parameter(s) in relation to the coil to determine the inductance of the coil at each of the frequencies, and determine whether and/or what kind of object is present depending on a change in inductance between each of the frequencies.

According to a further embodiment there is provided an inductive power transmitter comprising:
  at least one transmitting coil configured to generate at least two object detection signals at substantially different frequencies, and
  a controller configured to determine a measure of the inductance of the coil at each of the frequencies, and determine whether and/or what kind of object is present depending on a change in inductance between each of the frequencies.

According to a still further embodiment there is provided an inductive power transmitter comprising:
  at least one object detection coil,
  at least two resonant capacitors,
  at least two switches configured to connect a respective capacitor to the coil to resonant at a frequency, the value of the capacitors being substantially different, and
  a controller configured to determine a measure of the inductance of the coil at each of the frequencies, and determine whether and/or what kind of object is present depending on a change in inductance between each of the frequencies.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings, which are incorporated in and constitute part of the specification, illustrate embodiments of the invention and, together with the general description of the invention given above, and the detailed description of embodiments given below, serve to explain the principles of the invention.

DETAILED DESCRIPTION

Figure 1:
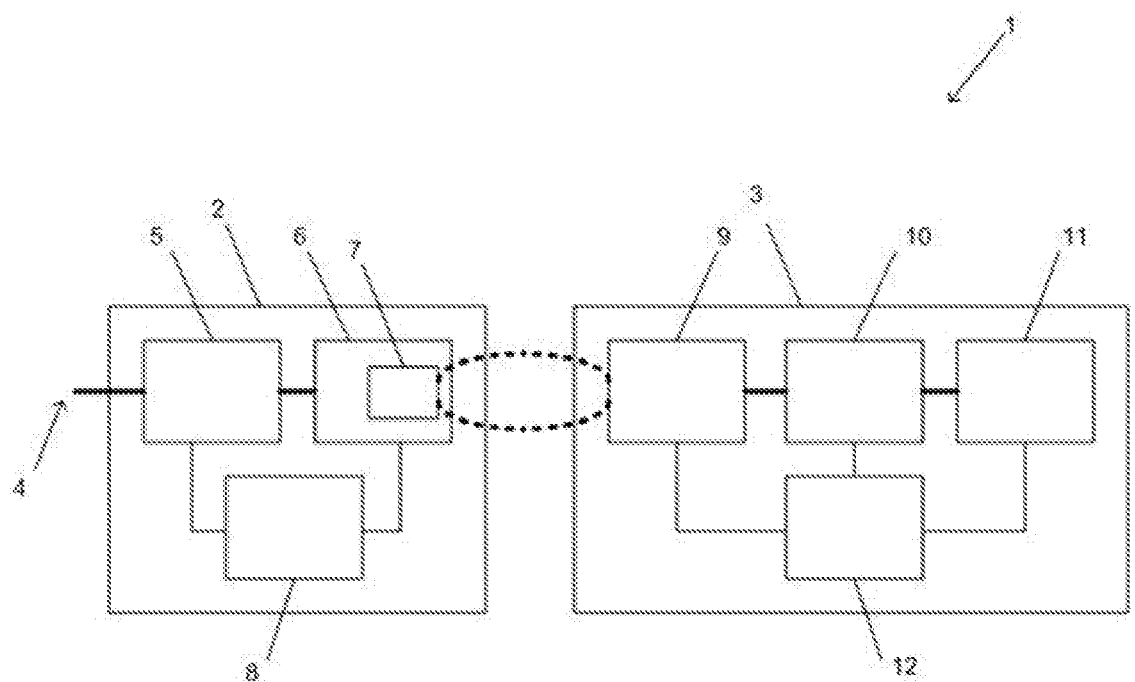
FIG. 1 is a schematic of an inductive power transfer system.

In some IPT applications it may be useful for a wireless power transmitter to only transfer power to specially designed power receivers and not to so-called 'foreign objects'. Foreign objects are defined as any object that is positioned in the charging location but are not part of one of a predetermined set of possible receiver devices. Typical examples of such foreign objects are metallic elements such as coins, keys, paperclips, etc. For example, if a metal object is close to the active IPT field, it could heat due to eddy currents being developed from the oscillating magnetic field. In order to prevent the temperature of such parasitic metal from rising to unacceptable levels, the power transmitter should be able to discriminate between power receivers and foreign objects and reduce the power being transferred or abort operation altogether. Various example embodiments will now be described for detecting foreign objects in relation to an inductive power transmitter.

A first method for detecting foreign objects is to measure power loss. In this method, the received real power is indicative of the total amount of real power dissipated within a power receiver contained in a handheld device due to the magnetic field produced by the power transmitter. The received real power equals the real power that is available from the output of the power receiver plus any real power that is lost in producing that output power. The power receiver communicates its received real power back to the power transmitter so that the power transmitter is able to determine whether the power loss is within acceptable set limits and, if not, the power transmitter determines anomalous behaviour indicative of the presence of a foreign object.

A second method for detecting foreign objects uses separate excitation and detection coils within the transmitter. Changes in the inductance of the detection coil are measured to determine the presence of a foreign object.

A third method to detect foreign objects is to actively generate a resonating voltage in a receiver or detection coil and then detect the Q value changes via the transmitter coil.

According to a further example embodiment, foreign object detection may rely on the way that foreign objects behave at different frequencies. For example, an IPT receiver may be tuned, such that its reflected impedance may be different around the resonant frequency. However, at frequencies distant from the resonant frequency, reflected parameters, such as an equivalent inductance, are relatively frequency-stable. Thus if an object detection coil is excited at a first low frequency and a second high frequency (where neither are close to the resonant frequency), the current can be measured to determine the inductance of the object detection coil. The difference between the inductance of the object detection coil at the low frequency and the high frequency will generally be very small when in the presence of an IPT receiver.

When a foreign object is introduced, its behaviour at different frequencies is likely to be significantly different; for example, the measured inductance of the object detection coil at the higher frequency has been observed to be significantly lower than at the lower frequency.

Thus, by measuring the changes in the inductance between the two frequencies, it is possible to achieve a relatively robust detection algorithm in an IPT environment. This may have the advantage(s) that:

It doesn't rely on receiver/transmitter communication;
It can reliably distinguish the presence of a FO even if a IPT receiver is present;
It can be used simultaneously with IPT;
Detection is relatively fast;
Accuracy and detection reliability are relatively high;
There are various circuits that can be used to detect the change in inductance that can be selected according to the requirements of the application;
OD power levels may be relatively modest and do not significantly affect the accuracy;
It doesn't require calibration or determine a baseline parameter for comparison;
It is able to discriminate between metal objects and ferrous or magnetic objects; and/or
No circuitry or modification is required at the receiver.

The foreign object detection may be implemented in an inductive power transfer (IPT) system 1, for example, such as that shown generally in FIG. 1a. The IPT system 1 typically comprises an inductive power transmitter 2 and an inductive power receiver 3. The inductive power transmitter 2 is connected to an appropriate power supply 4 such as mains power or a battery. The inductive power transmitter 2 may include transmitter circuitry having one or more of a converter 5, e.g., an AC-DC converter (depending on the type of power supply used) and an inverter 6, e.g., connected to the converter 5 (if present). The inverter 6 supplies a transmitting coil or coils 7 with an AC signal so that the transmitting coil or coils 7 generate an alternating magnetic field. In some configurations, the transmitting coil(s) 7 may also be considered to be separate from the inverter 5. The transmitting coil or coils 7 may be connected to capacitors (not shown) either in parallel or series to create a resonant circuit.

A controller 8 may be connected to each part of the IPT transmitter 2. The controller 8 may be adapted to receive inputs from each part of the IPT transmitter 2 and produce outputs that control the operation of each part. The controller 8 may be implemented as a single unit or separate units, configured to control various aspects of the IPT transmitter 2 depending on its capabilities, including, for example: foreign object detection, power flow, tuning, selectively energising transmitting coils, inductive power receiver detection, and/or communications. The controller 8 may have one or more units/components and may be a controller such as a microcontroller, PID, FPGA, CPLD, ASIC, etc.

Further, it may be possible to integrate significant parts of the entire wireless receiver circuit onto a single integrated circuit.

The inductive power receiver 3 includes a receiving coil or coils 9 connected to receiver circuitry which may include power conditioning circuitry 10 that in turn supplies power to a load 11. When the coils of the IPT transmitter 2 and the inductive power receiver 3 are suitably coupled, the alternating magnetic field generated by the transmitting coil or coils 7 induces an alternating current in the receiving coil or coils 9. The power conditioning circuitry 10 is configured to convert the induced current into a form that is appropriate for the load 11, and may include for example a power rectifier, a power regulation circuit, or a combination of both. The receiving coil or coils 9 may be connected to capacitors (not shown) either in parallel or series to create a resonant circuit. In some inductive power receivers, the receiver may include a controller 12, which may control tuning of the receiving coil or coils 9, operation of the power conditioning circuitry 10 and/or communications.

The term "coil" may include an electrically conductive structure where an electrical current generates a magnetic field. For example, inductive "coils" may be electrically conductive wire in three-dimensional shapes or two-dimensional planar shapes, electrically conductive material fabricated using printed circuit board (PCB) techniques into three-dimensional shapes over plural PCB 'layers', and other coil-like shapes. The use of the term "coil" in either singular or plural is not meant to be restrictive in this sense. Other configurations may be used depending on the application.

It may be desirable in certain applications for the IPT transmitter to selectively provide power to associated receiver devices (e.g., mobile phones, remote controls, etc.) and not to foreign objects (FO) (e.g., paperclips, coins, etc.). To this end, the IPT transmitter may include an Object Detection (OD) system. The OD system may either deactivate coils in response to non-receiver devices or only activate coils in the sole presence of receiver devices. In situations where there is a plurality of transmitting coils, such as an array of coils (e.g., on a charging mat), the OD system may only de/activate a subset of coil/s according to the location of the receiver/non-receiver device respectively. The FO detection algorithm mentioned earlier may form part of the OD system, or it may be the entire OD system depending on application requirements.

Figure 2:
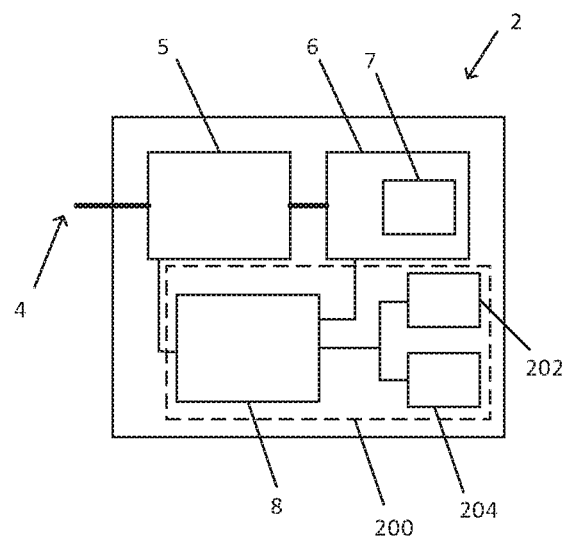
FIG. 2 is a block diagram of an object detection system.

An example transmitter 2 is shown in FIG. 2. The inverter 6 supplies power to the transmitting coil 7 to generate an IPT field. An OD circuit 200 includes an excitation coil or coils 202 to generate a OD field and a detection circuit 204 used to sense the presence and/or location of objects on or adjacent to the transmitter 2. The controller 8 of the transmitter 2 may either directly, or via a separate control circuit, be configured to determine the excitation to be provided to the excitation coil 202 and process the output signal from the OD circuit 204.

This may involve an array of coils, and/or a plurality of OD circuits depending on the requirements of the application. In alternative implementations the OD field may be generated by the transmitting coil 7 or may be a separate tuned coil, coupled or otherwise. It may be operated sequentially with the IPT field or simultaneously.

The OD field as mentioned above should operate at at least two significantly different frequencies. More than two frequencies may be used depending on the application. It is desirable that the upper and lower frequencies are chosen to allow reliable detection of the expected foreign objects for the particular application.

The observation above that the reflected inductance of foreign objects decreases with frequency may be explained in relation to the skin effect. The skin effect predicts that as frequency increases, a magnetic field will penetrate less into a conducting metal body. The eddy currents create an opposing magnetic field which opposes the magnetic field penetrating further. This leads to the concept of a skin depth, which is an indication of the expected penetration of magnetic field into a given metal for a given frequency. More precisely, the skin depth is where the current density is 1/e or 0.37 of the current density at the surface.

This blocking effect at higher frequencies has the equivalent effect of creating a reflected capacitance seen by an OD coil. In other words, if the inductance of the OD coil is measured, it will significantly decrease with excitation frequency if a metal FO is coupled to it.

In the context of typical foreign objects in proximity to an IPT transmitter, the skin effect may be exploited at realistic frequencies to distinguish them from known IPT receivers. For example, the skin depth is calculated according to Equation 1:

$$\delta = \sqrt{\frac{2\rho}{\omega\mu}} \quad (1)$$

Where
$\rho$=resistivity of the conductor
$\omega$=angular frequency of current=$2\pi\times$frequency
$\mu_r$=relative magnetic permeability of the conductor
$\mu_0$=the permeability of free space
$\mu=\mu_r\mu_0$ Therefore the skin depth is inversely proportional to the square root of the frequency. In other words, to provide a difference in skin depth of 10 times, the OD excitation frequencies should be 100 times different. It is expected that at least a 5 times different skin depth would be required for practical detection. In turn, the minimum frequency should be chosen in order to determine the minimum detectable FO thickness. This may be determined based on the expected FO for a given application.

For example, in IPT for consumer electronics, such as a charging pad for a mobile phone, with FO such as coins made of mostly of copper or steel the desired skin depth is between 1-2 mm at the high OD excitation frequency and less than 0.1-0.2 mm at the low OD excitation frequency. For example, the OD field may operate at 5-50 kHZ and greater than 500 kHz and the IPT field may operate at 50 kHz-500 kHz, e.g.: 110 to 205 kHz. To ensure the best operation performance in the presence of a receiver object, the OD field may be tuned to a frequency at least five times lower and higher than the IPT frequency. For example, for an IPT frequency of 110 kHz, the OD frequency can be tuned to 10 kHz or less, and at least 1 Mhz. Further, it may be desirable that the IPT frequency is not a harmonic of the OD frequency or vice versa to avoid and harmonic resonances in receiver devices (and therefore resulting receiver losses from the OD field).

In some embodiments, the transmitter comprises a coil 7 for inductive power transmission and a separate coil 202 for generation of the OD field. In alternative embodiments, the transmitter comprises a coil 7 configured for inductive power transmission and also for generation of an OD field.

Implementation 1: Separate OD Coil Excited at Two Frequencies

If a separate OD coil is used it can be excited at the two significantly different frequencies mentioned above. For a predetermined or measured excitation voltage and a predetermined or measured current, the inductance can be determined according to Equation 2 (if resistance is ignored):

$$\omega L = \frac{V}{I} \quad (2)$$

Figure 3:
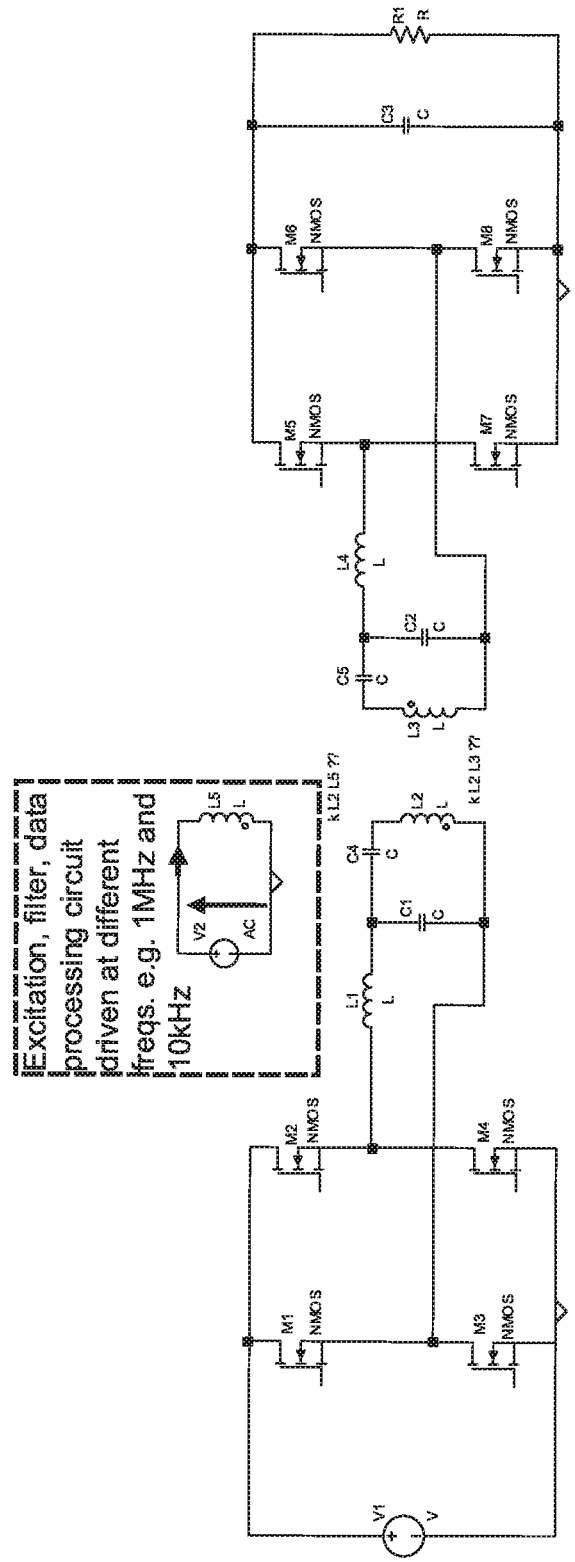
FIG. 3 is a circuit diagram of an example implementation.

Referring to FIG. 3, an OD circuit is shown including the transmitter 2, the OD circuit 200, OD coil 202 and a controllable AC power supply 302. The power supply may be a separate inverter.

The power supply may supply a substantially sinusoidal waveform at the frequencies of interest. The power levels of the OD signal should be small enough to not incur too much loss and also not too small to make the inductance hard to measure.

A detection algorithm may be implemented in hardware, e.g., logic, which provides a simple high or low signal to the main transmitter controller to perform the appropriate actions. Alternatively, the decision on whether an FO is nearby can be done in software running on the main transmitter controller. The algorithm includes the steps of testing at a first frequency, measuring the circuit parameters, determining the inductance, testing at a second significantly different frequency, measuring the circuit parameters, determining the inductance, and determining if a foreign object is present based on whether the difference in inductance values is over a threshold.

The determination should be done frequently enough to not cause significant heating of objects placed during power transfer, e.g., once every 1 or 2 seconds. More than 2 frequencies can be added to increase accuracy and/or knowledge about the FO. FOD can be done simultaneously with IPT as long as the inductance measurement can be performed accurately.

Depending on the application, detection of a FO could be used to alarm the user, e.g., to remove the coin and/or turning off the IPT field. Ideally the IPT field should be turned off before any excessive heating occurs, which may be done in conjunction with a separate temp sensor.

An experiment was carried out by connecting an OD coil according to implementation 1 to an LCR meter. The inductance of the coil was measured at two different frequencies under a number of different scenarios, e.g., by itself ("coil"), and by itself with a ferrite plate being placed on top of the coil ("ferrite"). The change in L between the upper and lower frequencies was 1% and 2.5% respectively, which demonstrates that L is relatively stable in coil itself across the different frequencies, and that the ferrite does not introduce any significant non-linearity.

Next, the coil was tested with various different FO nearby. Firstly with a 20 cent coin lying directly on top of the OD coil, and with a ferrite and a coin nearby ("FOD2"). This clearly shows that the presence of a metal object introduces a significant change in L across the different frequencies both with and without nearby ferrite. In this example a threshold of 5-10% change could be used to distinguish a metal object. This may provide a much simpler detection method compared to prior art methods.

TABLE 1

|  | Coil | ferrite | FOD1 | FOD2 |
|---|---|---|---|---|
| 10 kHz (uH) | 12.1 | 43.0 | 12.3 | 13.4 |
| 1 MHz (uH) | 12.0 | 42.0 | 10.6 | 11.0 |
| % ΔL | −1% | −2.5% | −15.3% | −19.6% |

Implementation 2: Separate Resonant OD Coil

Figure 4:
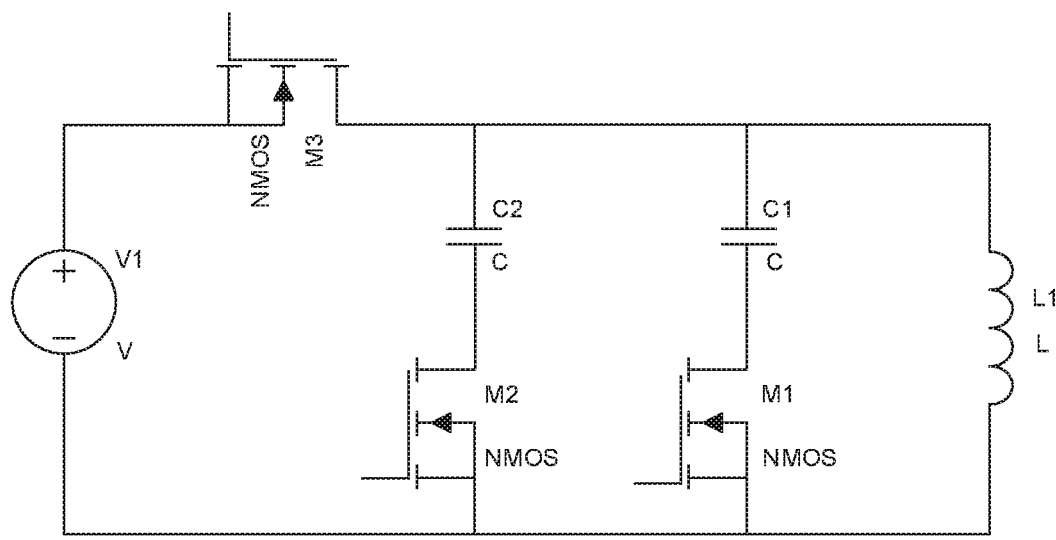
FIG. 4 is an alternative implementation.

FIG. 4 shows an alternative OD circuit 200, with a resonant tank including an OD coil L1 and two parallel tuned capacitors C1 C2. The resonant tank will have a natural resonant frequency according to Equation 3:

$$\omega = \frac{1}{\sqrt{LC}} \quad (3)$$

The values of C1 and C2 are chosen such that they resonate with L1 at two distinctively different frequencies (i.e. the FOD frequencies).

When the tank is excited by an impulse, or a DC signal, using switch M3, a transient response will occur according to the capacitor and the reflected inductance seen at the OD coil. This is done first with switch M1 closed and switch M2 opened, such that the frequency of the resulting transient is defined by L1 (including reflected impedance) and C1. The frequency/period of the transient response can be measured using a zero crossing detector and counters.

Then M1 is opened and M2 closed, such that the frequency is defined by L1 (including reflected impedance) and C2. The frequency is again measured. The inductance in each case is then determined according to equation 2. If the change in inductance is over a threshold, then a FO has been identified Implementation 3: Tx Coil Used for OD Excitation The two frequencies can also be generated using the main IPT coil 7. In this case, the OD signals are superimposed by the inverter on top of the IPT power transfer signal. In order to detect the changes in inductance, separate filters are provided in conjunction with a current transformer for each of the two OD frequencies. The filters may be notch filters or high/low pass filters, depending on the OD frequencies in relation to the IPT frequency. However, since the IPT signal is likely much stronger than the OD signal, filters with fast roll off (i.e. higher orders) might be required.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transmitter comprising:
a converter configured to generate at least two object detection signals at substantially different frequencies,
at least one transmitting coil configured to generate a magnetic field based on the object detection signals, and
a controller configured to determine or measure circuit parameter(s) in relation to the coil to determine the inductance of the coil at each of the frequencies, and determine whether or what kind of object is present depending on a change in inductance between each of the frequencies;
wherein a determination whether an object is present is based on whether the change in inductance is under or over a threshold and a foreign object is determined present if the absolute change in inductance is over a threshold.

2. The transmitter in claim 1, wherein the two frequencies are selected to detect predetermined foreign objects, based on the known skin depth of the predetermined foreign objects.

3. The transmitter in claim 1, wherein the at least two frequencies are more than 5 times different.

4. The transmitter in claim 1, wherein the at least two frequencies are more than 10 times different.

5. The transmitter in claim 1, wherein a first of the at least two frequencies is significantly lower than an inductive power transfer frequency, and a second of the at least two frequencies is significantly higher than an inductive power transfer frequency.

6. The transmitter in claim 1, wherein a significant decrease in inductance between each of the frequencies indicates a metal foreign object.

7. The transmitter in claim 6, wherein the threshold for detecting metal foreign objects is between 5-10%, or is substantially 10%.

8. The transmitter in claim 1, wherein the coil is coupled to an inductive power transmitting coil and is configured to superimpose the at least two object detection signals onto the IPT signals so that the signals operate simultaneously.

9. The transmitter in claim 1, wherein the coil is configured to generate the at least two object detection signals sequentially with an IPT signal.

10. The transmitter in claim 1, wherein the coil is an inductive power transmitting coil and is configured to superimpose the at least two object detection signals onto the IPT signals so that the signal operate simultaneously.

11. The transmitter in claim 1, wherein the controller is further configured to disable inductive power transfer to an inductive power receiver depending on if a foreign object is present.

12. The transmitter in claim 11, wherein the coil is energised at each of the frequencies and the inductance is determined based on the coil voltage and coil current.

13. The transmitter in claim 1, wherein the frequency of the inductive power transfer field is between 110 to 205 kHz.

14. The transmitter in claim 13, wherein the frequencies of the object detection signals are between 5 to 50 kHz and greater than 500 kHz.

15. An inductive power transmitter comprising:
a converter configured to generate at least two object detection signals at substantially different frequencies,
at least one transmitting coil configured to generate a magnetic field based on the object detection signals, and
a controller configured to determine or measure circuit parameter(s) in relation to the coil to determine the inductance of the coil at each of the frequencies, and determine whether and/or what kind of object is present depending on a change in inductance between each of the frequencies;
wherein the controller is further configured to disable inductive power transfer to an inductive power receiver depending on if a foreign object is present; and wherein a determination whether an object is present is based on whether the change in inductance is under or over a threshold and a foreign object is determined present if the absolute change in inductance is over a threshold.

16. The transmitter in claim 15, wherein a first of the at least two frequencies is lower than an inductive power transfer frequency, and a second of the at least two frequencies is higher than an inductive power transfer frequency.

17. The transmitter in claim 16, wherein the at least two frequencies are more than 5 times different.

18. The transmitter in claim 16, wherein the at least two frequencies are more than 10 times different.

19. The transmitter in claim 16, wherein the frequencies of the object detection signals are between 5 to 50 kHz and greater than 500 kHz.

20. The transmitter in claim 19, wherein the frequency of the inductive power transfer field is between 110 to 205 kHz.

21. The transmitter in claim 15, wherein the two frequencies are selected to detect predetermined foreign objects, based on the known skin depth of the predetermined foreign objects.

22. The transmitter in claim 15, wherein the coil is configured to generate the at least two object detection signals sequentially with an IPT signal.

23. The transmitter in claim 15, wherein the coil is configured to generate the at least two object detection signals simultaneously with an IPT signal.

24. The transmitter in claim 15, wherein the converter is configured to drive the transmitting coil at a wireless power transmission frequency based on the kind of object that is present.

25. The transmitter in claim 15, comprising a plurality of wireless power transfer coils, wherein the controller is further configured to activate a first subset of the plurality of wireless power transfer coils based on a location of the object.

26. The transmitter in claim 15, wherein the transmitting coil is further configured to generate additional object detection signals at frequencies that are different from the first and second frequencies and determine or measure circuit parameter(s) in relation to the coil to determine the inductance of the coil at each of the additional different frequencies, and determine what kind of object is present depending on a change in inductance between each of the frequencies.

27. The transmitter in claim 26, wherein the frequencies of the plurality of additional object detection signals are selected from:
    a first range of frequencies which spans the first frequency; and
    a second range of frequencies which spans the second frequency.

* * * * *